United States Patent
Verma et al.

(10) Patent No.: US 12,153,649 B1
(45) Date of Patent: Nov. 26, 2024

(54) SYSTEMS AND METHOD FOR DATA GRAFTING TO ENHANCE MODEL ROBUSTNESS

(71) Applicant: Wells Fargo Bank, N.A., San Francisco, CA (US)

(72) Inventors: Ashutosh Verma, Bangalore (IN); Tyler Case, Phoenixville, PA (US); Paul Davis, Irving, TX (US); Matt Hord, Stanley, NC (US); Ananth Kendapadi, Charlotte, NC (US); Vinothkumar Venkataraman, Bangalore (IN); Rameshchandra Bhaskar Ketharaju, Telangana (IN); Yang Angelina Yang, Mountain View, CA (US); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 289 days.

(21) Appl. No.: 17/645,735

(22) Filed: Dec. 22, 2021

(51) Int. Cl.
*G06F 18/214* (2023.01)
*G06F 18/20* (2023.01)
*G06F 18/21* (2023.01)

(52) U.S. Cl.
CPC ........ *G06F 18/2148* (2023.01); *G06F 18/217* (2023.01); *G06F 18/285* (2023.01)

(58) Field of Classification Search
CPC ... G06F 18/2148; G06F 18/217; G06F 18/285
USPC ....................................................... 382/159
See application file for complete search history.

(56) References Cited

U.S. PATENT DOCUMENTS

| | | |
|---|---|---|
| 2005/0222829 A1 | 10/2005 | Dumas |
| 2011/0131172 A1 | 6/2011 | Herzog et al. |
| 2015/0324686 A1 | 11/2015 | Julian et al. |
| 2016/0021503 A1 | 1/2016 | Tapia |
| 2016/0267396 A1 | 9/2016 | Gray et al. |
| 2016/0350671 A1* | 12/2016 | Morris, II .......... G05B 23/0229 |
| 2016/0371601 A1 | 12/2016 | Grove et al. |
| 2017/0323216 A1* | 11/2017 | Fano ..................... G06N 20/00 |
| 2019/0102700 A1 | 4/2019 | Babu et al. |
| 2019/0182545 A1 | 6/2019 | Manus et al. |
| 2019/0378044 A1* | 12/2019 | Jeffery .................. G06N 20/00 |

(Continued)

OTHER PUBLICATIONS

Olivares. "Neural basis expansion analysis with exogenous variables: Forecasting electricity prices with NBEATSx" Apr. 12, 2021) (Year: 2021).*

(Continued)

*Primary Examiner* — Juan A Torres
(74) *Attorney, Agent, or Firm* — K&L Gates LLP

(57) ABSTRACT

An example method includes detecting, by context analysis circuitry, occurrence of a triggering condition. The example method also includes scheduling, by context analysis circuitry and based on the occurrence of the triggering condition, retraining of a model. The example method also includes generating, by data grafting circuitry and in response to scheduling the retraining of the model, a context-relevant training data set based on a target context vector. The example method also includes retraining, by model training circuitry, the model using the context-relevant training data set to mitigate deterioration of performance of the model.

20 Claims, 6 Drawing Sheets

(56) References Cited

U.S. PATENT DOCUMENTS

2023/0119161 A1* 4/2023 Yadaw .................... G06F 40/30
707/706
2024/0037384 A1* 2/2024 Lore ..................... G06F 18/285

OTHER PUBLICATIONS

Chakravorty, et al., Regime detection based risk modeling of asses classes, Qplum, Feb. 2019, 14 pages.
Sangarshanan, Two is better than one: Ensembling Models, https://towardsdatascience.com/two-is-better-than-one-ensembling-models-611ee4fa9bd8, Jun. 29, 2018, 4 pages.
Analytic Vidhya, Feature Selection Techniques in Machine Learning; https://www.analyticsvidhya.com/blog/2020/10/feature-selection-techniques-in-machine-learing/, Oct. 10, 2020, 18 pages.

* cited by examiner

SYSTEMS AND METHOD FOR DATA GRAFTING TO ENHANCE MODEL ROBUSTNESS

BACKGROUND

Sudden deviations from standard behavior can cause models to fail or otherwise output inaccurate predictions. When model prediction deviates from a ground truth significantly enough, trust in the model may be reduced.

BRIEF SUMMARY

Predictive modeling is a commonly used statistical technique to predict future behavior or outcomes. Predictive modeling typically involves analyzing historical and current data and generating and deploying a modeling system trained on said data to help predict future outcomes. However, significant changes in normal behavior can negatively influence a deployed modeling system and reduce the performance of the model (e.g., reduce an accuracy of predictions made by the model) such that an output of the modeling system may be misleading or wrong.

For example, exogenous context (e.g., various conditions outside of a modeling system at a point in time) may induce a significant change in normal behavior, which may in turn affect performance of a model. For example, an outbreak of a highly contagious virus may significantly decrease foot traffic in a normally heavily-populated downtown district. As another example, a sudden drop in temperature may lead to a decrease in purchases of frozen food items and an increase in purchases of hot food items.

When a deployed modeling system begins outputting incorrect predictions, trust in the modeling system may be diminished and future considerations of the modeling system may be negatively influenced even though the modeling system may still be suitable and only temporarily negatively affected by sudden changes in behavior (e.g., in response to a current exogenous context deviating from normal context). Therefore, a technical need exists to enable modeling systems to be quickly retrained using context-relevant data to mitigate deterioration of model performance.

Systems, apparatuses, methods, and computer program products are disclosed herein for mitigating deterioration of model performance. In this regard, a model may be continuously analyzed to detect occurrence of a triggering condition, and, if the triggering condition occurs, the model may be retrained using a training data set relevant to an exogenous context for a data point being processed by the model.

In one example embodiment, a method is provided for mitigating deterioration of model performance. The method includes detecting, by context analysis circuitry, occurrence of a triggering condition. The method also includes scheduling, by context analysis circuitry and based on the occurrence of the triggering condition, retraining of a model. The method also includes, in response to scheduling the retraining of the model, generating, by data grafting circuitry, a context-relevant training data set based on a target context vector. The method also includes retraining, by model training circuitry, the model using the context-relevant training data set to mitigate deterioration of performance of the model.

In another example embodiment, an apparatus is provided for mitigating deterioration of model performance. The apparatus includes context analysis circuitry configured to detect occurrence of a triggering condition and schedule, based on the occurrence of the triggering condition, retraining of a model. The apparatus also includes data grafting circuitry configured to generate, in response to scheduling the retraining of the model, a context-relevant training data set based on a target context vector. The apparatus also includes model training circuitry configured to retrain the model using the context-relevant training data set to mitigate deterioration of performance of the model.

In another example embodiment, a computer program product is provided for mitigating deterioration of model performance. The computer program product includes at least one non-transitory computer-readable storage medium storing software instructions that, when executed, cause an apparatus to detect occurrence of a triggering condition. The software instructions, when executed, also cause the apparatus to schedule, based on the occurrence of the triggering condition, retraining of a model. The software instructions, when executed, also cause the apparatus to, in response to scheduling the retraining of the model, generate a context-relevant training data set based on a target context vector. The software instructions, when executed, also cause the apparatus to retrain the model using the context-relevant training data set to mitigate deterioration of performance of the model.

In another example embodiment, a method is provided. The method includes selecting, by context vector generation circuitry, a plurality of variables defining an exogenous context for a target data point. The method also includes identifying, by the context vector generation circuitry, values for the plurality of variables based at least on a context indicator of the target data point. The method also includes generating, by the context vector generation circuitry, a context vector based on the identified values for the plurality of variables. The method also includes storing, by the context vector generation circuitry, the context vector in a known training data index.

In another example embodiment, an apparatus is provided. The apparatus includes context vector generation circuitry configured to select a plurality of variables defining an exogenous context for a target data point, identify values for the plurality of variables based at least on a context indicator of the target data point, generate a context vector based on the identified values for the plurality of variables, and store the context vector in a known training data index.

In another example embodiment, a computer program product is provided. The computer program product includes at least one non-transitory computer-readable storage medium storing software instructions that, when executed, cause an apparatus to select a plurality of variables defining an exogenous context for a target data point. The software instructions, when executed, also cause the apparatus to identify values for the plurality of variables based at least on a context indicator of the target data point. The software instructions, when executed, also cause the apparatus to generate a context vector based on the identified values for the plurality of variables. The software instructions, when executed, also cause the apparatus to store the context vector in a known training data index.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
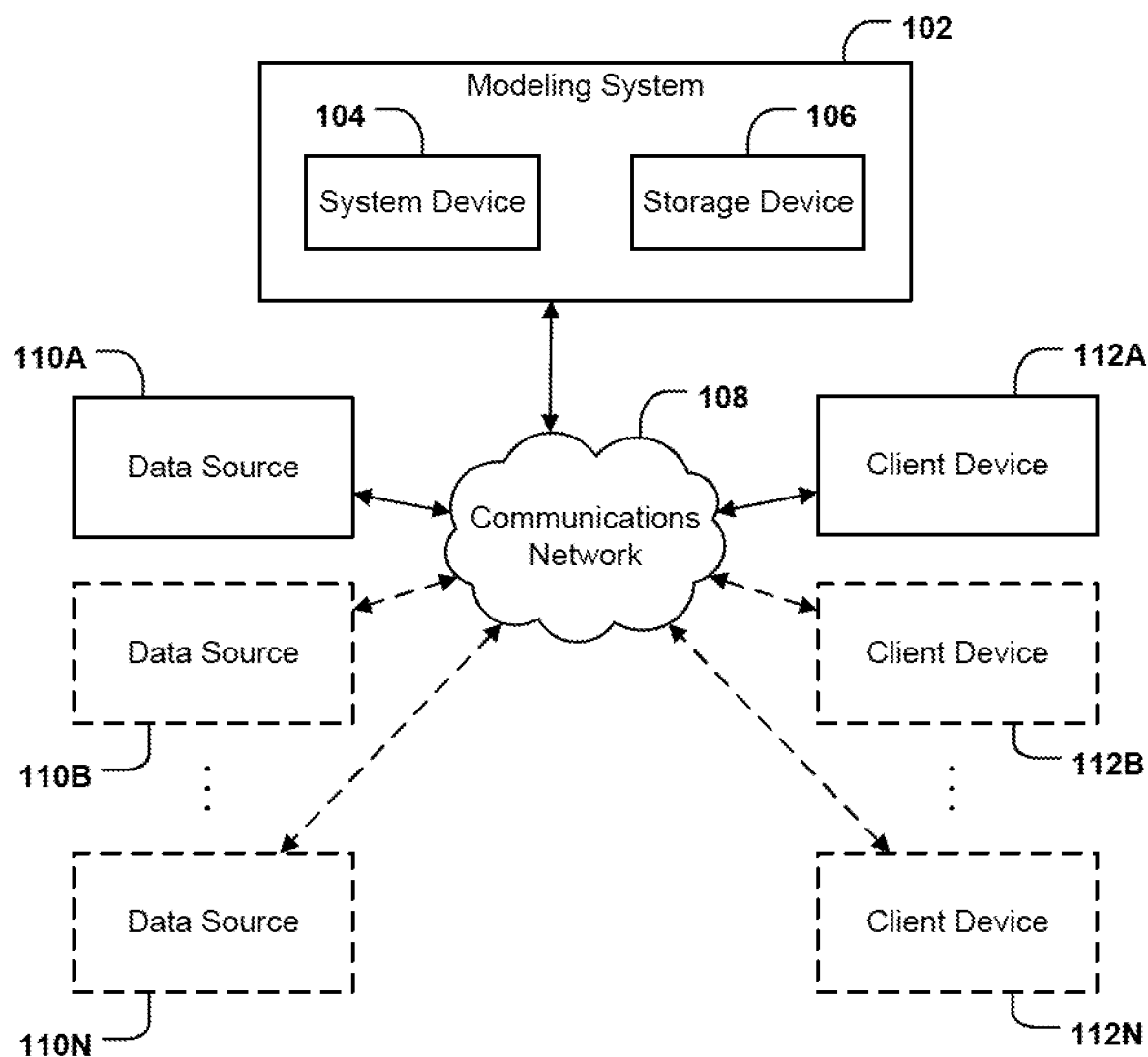
FIG. 1 illustrates a system in which some example embodiments may be used for mitigating deterioration of model performance.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "exogenous context" refers to a set of information (e.g., a set of variables) that define various environmental conditions at a particular point in time and external to a modeling system. For example, an example exogenous context for a particular data point may include information associated with the data point, such as a date, time, geolocation, current temperature or other weather-related information, economic data, financial data, and/or other data which may be relevant to the particular data point. As a simple example, a data point indicating a user's mobile device being located in a shopping mall on a Thursday at 10 AM may have an exogenous context defined by a plurality of variables (e.g., in a context vector) including internal and/or external temperature, a weather forecast (e.g., raining, sunny, etc.), other devices carried by the user, other users accompanying the user, recent purchases made by the user, economic conditions at the time, etc.

The term "context vector" refers to a data structure comprising a plurality of dimensions in which each dimension indicates a corresponding piece of information (e.g., a variable having an associated value) regarding the exogenous context for a particular data point. A context vector may be generated using data queried from multiple disparate data sources using a context indicator of a data point. A context vector thus provides a lightweight and streamlined data structure for storing information relevant to an exogenous context for a data point, which can be used for retraining a model when included as part of a context-relevant training data set.

The term "context indicator" refers to data included in or inferred from a data point received or otherwise obtained by a modeling system. In some embodiments, a context indicator may be temporal data indicating a particular date and/or time, such as a timestamp or the like. In some embodiments, a context indicator may be data indicating a particular location captured by the data point, such as a geographical location (e.g., location coordinates), an indication of a particular address, establishment name, and/or the like.

Overview

As noted above, methods, apparatuses, and computer program products are described herein that provide for mitigating deterioration of model performance. Traditionally, it has been very difficult to efficiently mitigate deterioration of model performance in response to changes in exogenous context and/or performance decline before a model has been significantly impacted by the changes. In addition, there is typically no way to effectively generate a context-relevant training data set and subsequently retrain a model in real- or near real-time such that the model can continue to make accurate predictions and/or other generate appropriate outputs.

In contrast to conventional techniques for model retraining, example embodiments described herein provide an improved modeling system that efficiently recognizes triggering conditions warranting a need to retrain one or more models and, in response, generates relevant training data to do so. In this regard, data points continuously received by a modeling system are processed to generate context vectors for the data points. A context vector for a data point may include values for a plurality of variables that define an exogenous context for the data point. The context vectors, as generated, may be stored in a known training data index. A model may be continuously analyzed to detect occurrence of a triggering condition, and, if the triggering condition occurs, a retraining of the model may be performed using a context-relevant training data set derived from the known training data index. For example, a plurality of relevant context vectors from disparate time periods that are included the known training data index may be grafted together to form the context-relevant training data set.

In this manner, the model may be efficiently retrained based on historical data points sharing similar context to a target data point. By retraining a model using more relevant training data, the present disclosure sets forth systems, methods, and apparatuses that mitigate deterioration of model performance due to changes in exogenous context.

Accordingly, example embodiments enable models to continue to output relevant predictions even when faced with sudden and/or significant changes in exogenous context (e.g., spurred on, in some examples, by major events such as natural disasters, virus outbreaks, or the like). Embodiments herein thus provide an automated solution that can operate in real-time or near real-time to effectively mitigate deterioration in model performance while also harnessing a greater volume of training data than may otherwise be possible. Further, embodiments herein avoid any need for manual human intervention for retraining or other correction of the model. Moreover, example embodiments can in certain scenarios actually enhance model performance by avoiding use of training data that is unrelated to a relevant environmental context.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a modeling system 102 may include a system device 104 in communication with a storage device 106. Although system device 104 and storage device 106 are described in singular form, some embodiments may utilize more than one system device 104 and/or more than one storage device 106. Additionally, some embodiments of the modeling system 102 may not require a storage device 106 at all. Whatever the implementation, the modeling system 102, and its constituent system device(s) 104 and/or storage device (s) 106 may receive and/or transmit information via communications network 108 (e.g., the Internet) with any number of other devices, such as one or more of data sources 110A, 110B, through 110N, and/or client devices 112A, 112B, through 112N.

System device 104 may be implemented as one or more servers, which may or may not be physically proximate to other components of modeling system 102. Furthermore, some components of system device 104 may be physically proximate to the other components of modeling system 102 while other components are not. System device 104 may receive, process, generate, and transmit data, signals, and electronic information to facilitate the operations of the modeling system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the modeling system 102. Storage device 106 may store information relied upon during operation of the modeling system 102, such as various data that may be used by the modeling system 102 and/or the like. In addition, storage device 106 may store control signals, device characteristics, and access credentials enabling interaction between the modeling system 102 and one or more of the data sources 110A-110N or client devices 112A-112N.

The one or more data sources 110A-110N may be embodied by any computing devices known in the art, such as servers, desktop or laptop computers, tablet devices, smartphones, or the like or may be embodied by any storage devices known in the art. Similarly, the one or more client devices 112A-112N may be embodied by any computing devices known in the art, such as desktop or laptop computers, tablet devices, smartphones, or the like. The one or more data sources 110A-110N and the one or more client devices 112A-112N need not themselves be independent devices, but may be peripheral devices communicatively coupled to other computing devices.

Although FIG. 1 illustrates an environment and implementation in which the modeling system 102 interacts with one or more of data sources 110A-110N and/or client devices 112A-112N, in some embodiments users may directly interact with the modeling system 102 (e.g., via input/output circuitry of system device 104). Whether by way of direct interaction or via a separate client device 112A-112N, a user may communicate with, operate, control, modify, or otherwise interact with the modeling system 102 to perform the various functions and achieve the various benefits described herein.

Example Implementing Apparatuses

Figure 2:
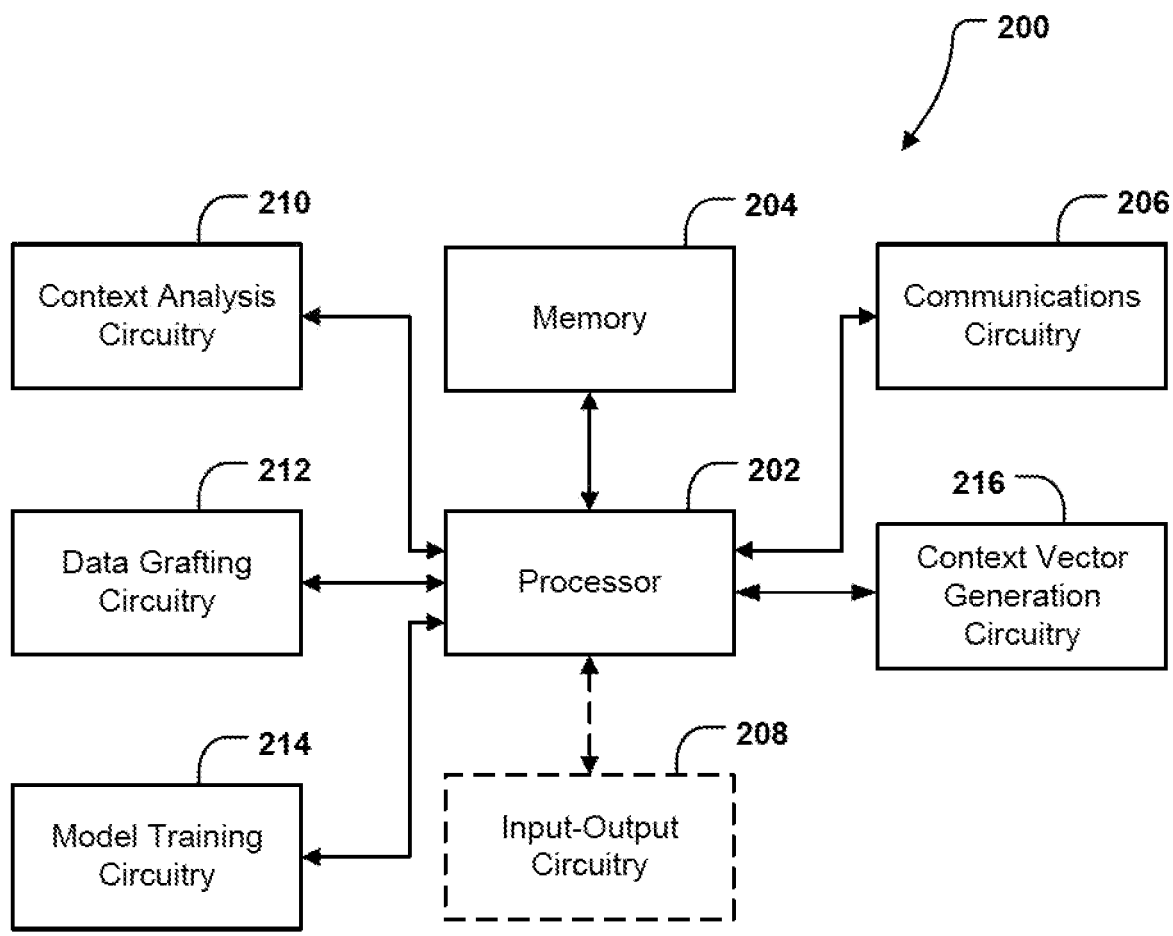
FIG. 2 illustrates a schematic block diagram of example circuitry embodying a device that may perform various operations in accordance with some example embodiments described herein.

System device 104 of the modeling system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, context analysis circuitry 210, data grafting circuitry 212, model training circuitry 214, and context vector generation circuitry 216, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processor for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as one of client devices 112A-112N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises context analysis circuitry 210 that analyzes performance of a model over time and detects occurrence of a triggering condition. The context analysis circuitry 210 may utilize processor 202, memory 204, or any other hardware component included in the apparatus 200 to perform these operations, as described in connection with FIGS. 3-6 below. The context analysis circuitry 210 may further utilize communications circuitry 206 to gather data from a variety of sources (e.g., data sources 110A-110N, client devices 112A-112N, or storage device 106, as shown in FIG. 1), may utilize input-output circuitry 208 to receive data from a user, and in some embodiments may utilize processor 202 and/or memory 204 to schedule retraining of a model.

In addition, the apparatus 200 further comprises data grafting circuitry 212 that generates a context-relevant training data set based on a target context vector. The data grafting circuitry 212 may utilize processor 202, memory 204, or any other hardware component included in the apparatus 200 to perform these operations, as described in connection with FIGS. 3-6 below. The data grafting circuitry 212 may further utilize communications circuitry 206 to gather data from a variety of sources (e.g., data sources 110A-110N, client devices 112A-112N, or storage device 106, as shown in FIG. 1), and in some embodiments may utilize processor 202 and/or memory 204 to generate a context-relevant training data set.

In addition, the apparatus 200 further comprises model training circuitry 214 that retrains a model using a context-relevant training data set. The model training circuitry 214 may utilize processor 202, memory 204, or any other hardware component included in the apparatus 200 to perform these operations, as described in connection with FIGS. 3-6 below. The model training circuitry 214 may further utilize communications circuitry 206 to gather data from a variety of sources (e.g., storage device 106, as shown in FIG. 1), and in some embodiments may utilize processor 202 and/or memory 204 to retrain a model using a context-relevant training data set.

In addition, the apparatus 200 further comprises context vector generation circuitry 216 that selects a plurality of variables defining an exogenous context for a target data point and generates a context vector based on the identified values for the plurality of variables. The context vector generation circuitry 216 may utilize processor 202, memory 204, or any other hardware component included in the apparatus 200 to perform these operations, as described in connection with FIGS. 3-6 below. The context vector generation circuitry 216 may further utilize communications circuitry 206 to gather data from a variety of sources (e.g., data sources 110A-110N, client devices 112A-112N, or storage device 106, as shown in FIG. 1), may utilize input-output circuitry 208 to receive data from a user, and in some embodiments may utilize processor 202 and/or memory 204 to generate a context vector and store the context vector in a known training data index.

Although components 202-216 are described in part using functional language, it will be understood that the particular implementations necessarily include the use of particular hardware. It should also be understood that certain of these components 202-216 may include similar or common hardware. For example, the context analysis circuitry 210, data grafting circuitry 212, model training circuitry 214, and context vector generation circuitry 216 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the context analysis circuitry 210, data grafting circuitry 212, model training circuitry 214, and context vector generation circuitry 216 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the context analysis circuitry 210, data grafting circuitry 212, model training circuitry 214, and context vector generation circuitry 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3-6, example flowcharts are illustrated that contain example operations implemented by example embodiments described herein. The operations illustrated in FIGS. 3-6 may, for example, be performed by system device 104 of the modeling system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, context analysis circuitry 210, data grafting circuitry 212, model training circuitry 214, context vector generation circuitry 216, and/or any combination thereof. It will be understood that user interaction with the modeling system 102 may occur directly via input-output circuitry 208, or may instead be facilitated by a separate client device 112A-112N, as shown in FIG. 1, and which may have similar or equivalent physical componentry facilitating such user interaction.

Generation of Context Vectors and Known Training Data Index

Figure 3:
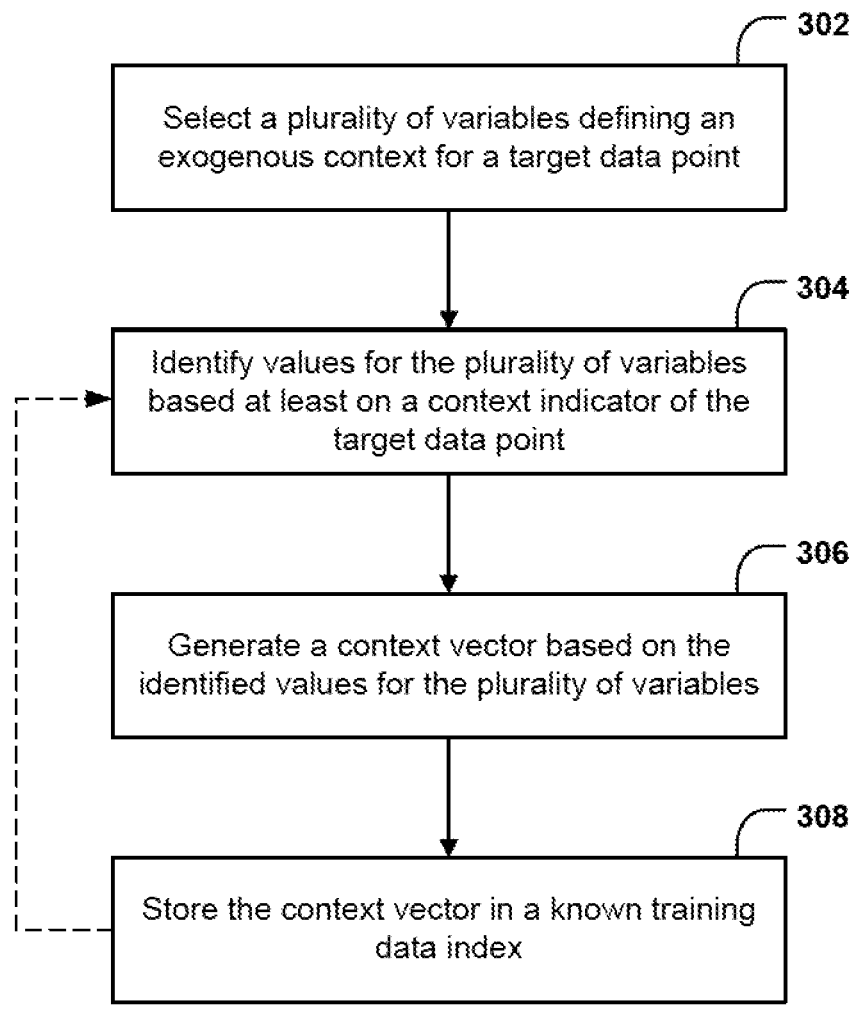
FIG. 3 illustrates an example flowchart for generating context vectors of a known training data index, in accordance with some example embodiments described herein.

Turning first to FIG. 3, example operations are shown for generating context vectors to be included within a known training data index. The operations set forth in connection with FIG. 3 may be performed using data points received by a modeling system in real- or near-real-time (e.g., a context vector may be generated for each new data point, and then as the data point is cataloged in a known training data index, the context vector is included with the data point). It will be understood, however, that in some embodiments the operations set forth in FIG. 3 may be performed on a historical data set (e.g., on a known training data index that does not yet have context vectors that have been generated for its various data points), in which case the operations set forth in FIG. 3 may be iteratively performed for each data point in the historical data set. In some embodiments, these operations may be performed on an ad hoc basis (e.g., where a data set has some data points with context vectors and some without, or where a user proactively directs the generation of a context vector for a data point).

As shown by operation 302, the apparatus 200 includes means, such as processor 202, memory 204, context vector generation circuitry 216, or the like, for selecting a plurality of variables defining an exogenous context for a target data point. In some embodiments, the modeling system 102 may receive (e.g., via communications circuitry 206) or otherwise obtain over time various data points in real-time or in near real-time from various sources (e.g., data sources 110A-110N, client devices 112A-112N, and/or other sources). These various data points may be used by the modeling system 102, e.g., to make predictions using one or more models, to build out training data, and/or other purposes. In some embodiments, the modeling system 102 may process a target data point (e.g., a data point for which a context vector is to be generated) in order to determine an exogenous context for the target data point and create a context vector which describes the target data point and its exogenous context. In this regard, a plurality of variables may be selected to define the exogenous context of the target data point. In some embodiments, the target data point may reflect current information collected in near real-time. In some embodiments, the target data point may reflect historical information (e.g., the target data point was previously collected at an earlier point in time). In this regard, the target data point may have been retrieved by the modeling system 102 from a pre-existing data set (e.g., a known training data index as further described below and/or other data set). Selection of the plurality of variables defining the exogenous context for the target data point may occur in a number of ways. In some embodiments, a predefined set of variables may apply to defining an exogenous context for all data points obtained by the modeling system 102. For instance, the predefined set of variables may be received from a user (in which case the context vector generation circuitry 216 may leverage the input-output circuitry 208 to retrieve that user input, or may leverage the communications circuitry 206 to gather that user input from a separate device), or the predefined set of variables may be retrieved from storage (in which case the context vector generation circuitry 216 may retrieve the plurality of variables from memory 204 or from a storage device hosted by a separate device). However, in some embodiments, the plurality of variables may be identified directly by the context vector generation circuitry 216. To this end, the context vector generation circuitry 216 may determine the set of variables available about the time, date, or location of the target data point, and may automatically determine a subset of the available variables that are relevant to exogenous context. Many variables about a target data point may not relate to context, and thus may be discarded by the context vector generation circuitry 216. Any remaining variables may be selected as the plurality of variables defining the exogenous context for the target data point.

In some embodiments, the plurality of variables used to define an exogenous context, in some embodiments, may be predefined based on a type of data point. For example, certain variables may apply to all data points obtained by the modeling system 102, such as, for example, a location and a time for the data point, whereas other variables may only apply in certain circumstances, such as for certain types of data points (economic information may automatically be deemed relevant for data points relating to purchases or other financial transactions, while it may automatically be deemed irrelevant for data points that do not relate to purchases or financial transactions).

As shown by operation 304, the apparatus 200 includes means, such as processor 202, memory 204, communications circuitry 206, context vector generation circuitry 216, and/or the like, for identifying values for the plurality of variables based at least on a context indicator of the target data point. An example context indicator may be a timestamp of the data point. In some embodiments, the timestamp may comprise a date and/or time for the data point. Another example context indicator may be a geolocation associated with the data point (e.g., a location from which the data point originated).

In this regard, the modeling system 102 may utilize additional, external systems to retrieve information pertinent to determining an exogenous context for the target data point. The modeling system 102 may leverage a context indicator of the data point rather than all information regarding the data point in order to utilize the smallest required amount of relevant information needed for populating the context vector for the target data point while avoiding unnecessary data transmission and/or burdening of a network (e.g., communications network 108) with unnecessary data load transfer. In some embodiments, multiple context indicators may be used to obtain value(s) for one or more variables. For example, a value for a temperature variable indicating the temperature at the particular location and particular time of the data point may be retrieved from a data source 110A-110N (e.g., the National Weather Service or other organization providing weather data) by querying the data source for data based on context indicators for a geolocation and a date/time (e.g., a query for the temperature at 3 PM on August 10 in Austin, Texas).

In this regard, the apparatus 200 includes means, such as processor 202, memory 204, communications circuitry 206, and/or the like, for querying one or more data sources using at least the context indicator for the target data point. The apparatus 200 also includes means, such as processor 202, memory 204, communications circuitry 206, and/or the like, for retrieving at least a portion of the values for the plurality of variables from the one or more data sources. In some embodiments, querying and retrieval of the values may be performed for each variable defining the exogenous context of a target data point. In some cases, the values for the plurality of variables may already been available locally to the apparatus 200, in which case an external query may not be needed or performed.

As shown by operation 306, the apparatus 200 includes means, such as processor 202, memory 204, context vector generation circuitry 216, and/or the like, for generating a context vector based on the identified values for the plurality of variables. In this regard, each variable and its corresponding identified value may be stored as respective dimensions of a context vector. The context vector provides a streamlined definition of an exogenous context for a particular data point.

The context vector may then be stored together with a plurality of other context vectors having been generated for other data points in a known training data index. For example, the known training data index may be stored in memory 204, storage device 106, in cloud-based storage (e.g., via communications network 108), or the like. In this regard, as shown by operation 308, the apparatus 200 includes means, such as processor 202, memory 204, communications circuitry 206, context vector generation circuitry 216, and/or the like, for storing the context vector in a known training data index. In some embodiments, the method may iteratively return to operation 304 in which additional context vectors for additional data points (e.g., in a preexisting data set) may be generated.

Mitigating Deterioration of Model Performance

Figure 4:
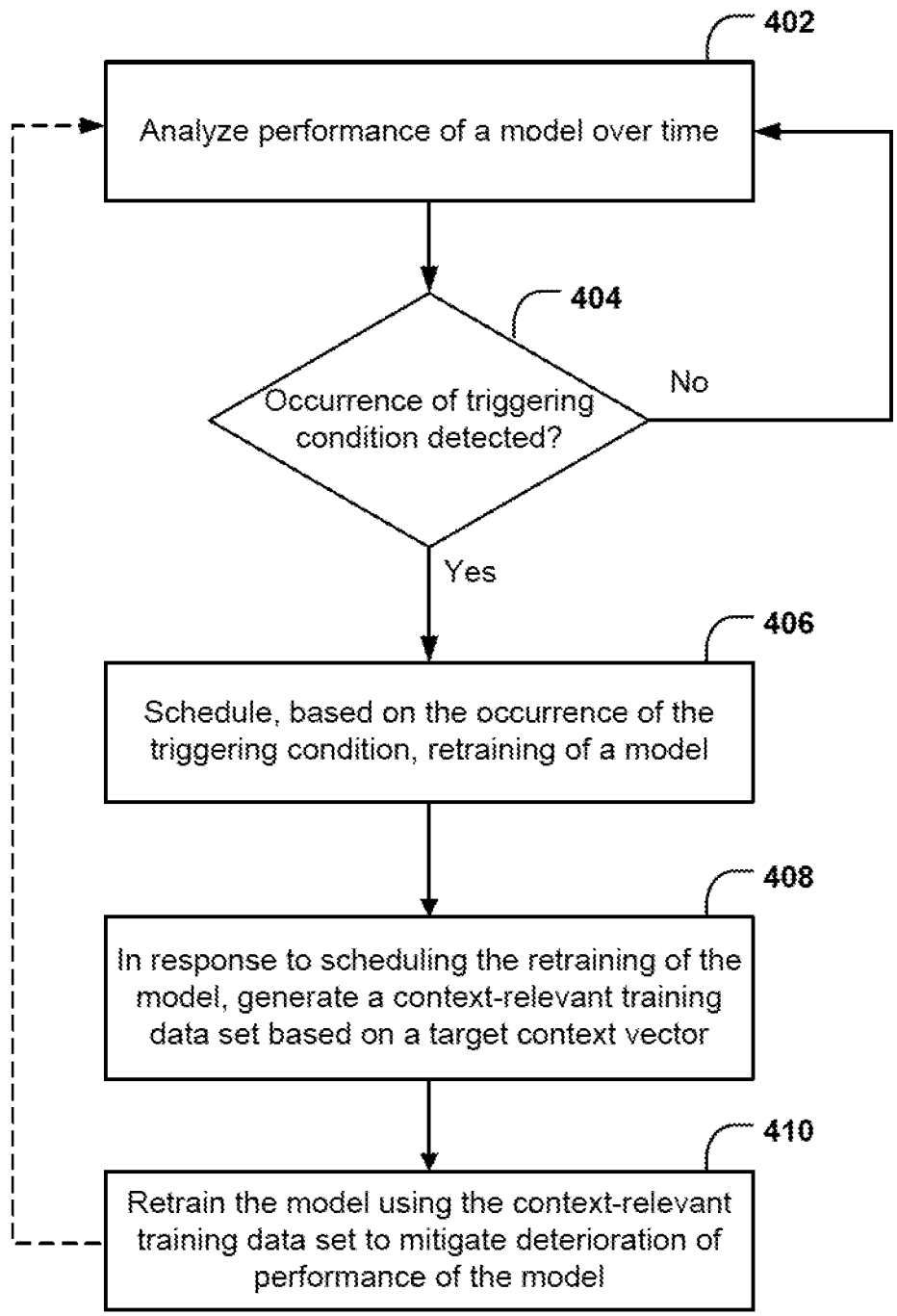
FIG. 4 illustrates an example flowchart for mitigating deterioration of model performance, in accordance with some example embodiments described herein.

Turning next to FIG. 4, example operations are shown for mitigating deterioration of model performance using context vectors such as those generated in the way described above.

As shown by operation 402, the apparatus 200 includes means, such as processor 202, memory 204, communications circuitry 206, input-output circuitry 208, context analysis circuitry 210, or the like, for analyzing performance of a model over time. For example, the modeling system 102 may analyze output of a model (e.g., using context analysis circuitry 210) to gauge performance of the model in terms of how accurate the model's predictions are over a period of time. In this regard, output of the model may be compared to a ground truth so the predictions of the model can be scored based on how accurate they are. The performance of the model may be analyzed to detect occurrence of a triggering condition that indicates retraining of the model may be needed to mitigate performance deterioration of the model. In some embodiments, a triggering condition comprises a decline in performance of a model, a change in exogenous context, or a decline in performance of a model coupled with a change in exogenous context.

In this regard, as shown by decision point 404, the apparatus 200 includes means, such as processor 202, memory 204, context analysis circuitry 210, or the like, for detecting occurrence of a triggering condition. As the modeling system 102 continuously analyzes performance of the model, if it is determined that a triggering condition has not yet occurred (e.g., the model continues to perform at an acceptable level and/or a change in exogenous context has not occurred), the method may return to operation 402 wherein the modeling system 102 (e.g., via context analysis circuitry 210) continues to analyze performance of the model. This detection operation may occur continuously in a background process as the model is used in a production environment.

In some embodiments, the triggering condition comprises a decline in performance of the model meeting a predefined decline threshold. In this regard, the context analysis circuitry may detect occurrence of the triggering condition by analyzing performance of the model over time and identifying the predefined decline threshold in performance of the model. In some embodiments, the triggering condition may be configurable, such that a user can configure parameters which define boundaries for the triggering condition. For example, in some embodiments, the predefined decline threshold may be identified as having been met when a combination of measures is identified as having been met. For example, a combination of measures may include a decline in Area Under Curve (AUC) by, e.g., 10% and a decline in an F1 score by 5%. Other measures may also be considered in determining whether the performance of the model meets a predefined decline threshold.

In some embodiments, the predefined decline threshold may be identified in an instance in which analyzing performance of the model over time indicates that the model produces more than a predefined percentage of inaccurate predictions over a predefined time period. As one example, over a predefined time period (e.g., 3 days), if more than a predefined percentage (e.g., 60%) of the predictions output by the model are determined to be inaccurate, the predefined decline threshold may be identified as having been met. The predefined percentage may be selected by a user for a particular implementation, or may simply comprise a default setting selected during initialization of the solution.

In some embodiments, the predefined decline threshold may be identified in an instance in which analyzing performance of the model over time indicates that a predefined number of predictions by the model are inaccurate by more than a predefined performance threshold. As one example, if the model outputs a series of at least five inaccurate predictions, the predefined decline threshold may be identified as having been met. The predefined performance threshold may be selected by a user for a particular implementation, or may simply comprise a default setting selected during initialization of the solution.

In some embodiments, the triggering condition comprises a change in exogenous context. For example, if a significant change has occurred in the exogenous context, this change may warrant retraining of the model. However, in some embodiments, a change in exogenous context may not necessarily mean that the model should be retrained, if the model continues output accurate predictions. In this regard, in some embodiments, the triggering condition comprises a decline in performance of the model coupled with a change in exogenous context. In this regard, a decline in performance may be due to a change in exogenous context.

In some embodiments, the context analysis circuitry may identify a change in exogenous context (and therefore identify the occurrence of a triggering condition) through a similarity calculation of a target context vector with a previous context vector, as described below in connection with FIG. 5.

Figure 5:
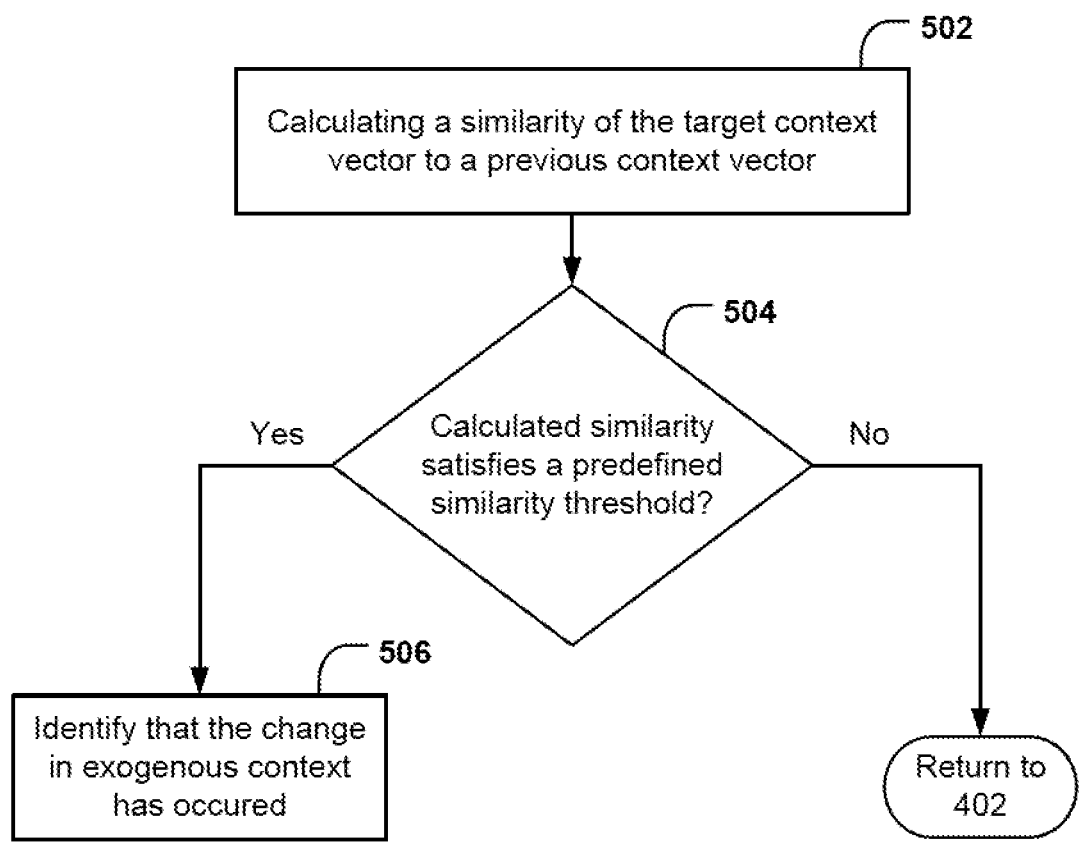
FIG. 5 illustrates an example flowchart for identifying occurrence of a change in exogenous context, in accordance with some example embodiments described herein.

Turning briefly to FIG. 5, example operations are shown for identifying occurrence of a change in exogenous context.

As shown by operation 502, the apparatus 200 includes means, such as processor 202, memory 204, context analysis circuitry 210, and/or the like, for calculating a similarity of the target context vector to a previous context vector. For example, a target context vector may be a context vector that defines an exogenous context for a data point being processed by one or more models of the modeling system 102. For example, the data point may be a current data point being analyzed by the model in order to output a prediction based on the data point. A previous context vector may be a context vector defining an exogenous context for the same data point received by the modeling system 102 at a previous point in time. For example, the previous context vector may comprise the most recent exogenous context for that data point prior to receiving the target data point. In some embodiments, the previous context vector may comprise multiple context vectors obtained prior to the data point associated with the target context vector (e.g., multiple data points over a previous 24-hour period).

In some embodiments, calculating the similarity of the target context vector to a previous context vector may comprise calculating the cosine similarity of the target context vector and the previous context vector. A cosine similarity operation measures the cosine of the angle between two vectors, which is the inner product of the same vectors normalized to both have length 1. As shown by decision point 504, the apparatus 200 includes means, such as processor 202, memory 204, context analysis circuitry 210, or the like, for determining whether the calculated similarity satisfies a predefined similarity threshold. The predefined similarity threshold may be selected by a user for a particular implementation, or may simply comprise a default setting selected during initialization of the solution. The threshold may be adjusted based on the sensitivity of a given model to exogenous context (for a model that is highly context-dependent, the similarity threshold may be more exacting than for a model that is durable and reliable in a variety of contexts). If the resulting calculated cosine similarity does not satisfy the predefined similarity threshold (e.g., the variable values of the target context vector and previous context vector are substantially similar), it may be determined that a change in exogenous context has not occurred and the method may return to operation 402 wherein performance of the model continues to be analyzed. However, if the resulting calculated cosine similarity satisfies a predefined similarity threshold (e.g., the variable values of the target context vector have changed significantly from values of previous context vector), the method may continue to operation 506. Although calculation of the similarity of a target context vector to a previous context vector may be performed using a cosine similarity operation, it will be appreciated that other similarity measures may additionally, or alternatively, be used to evaluate similarity of two context vectors, such as their Euclidean distance, Manhattan distance, Minkowski distance, dot product, Pearson similarity, or the like. Multiple similarity measures may be used in combination in some embodiments, with the predefined similarity threshold identifying a required value for one or more of the multiple similarity measures.

As shown by operation 506, the apparatus 200 includes means, such as processor 202, memory 204, context analysis circuitry 210, or the like, for identifying that the change in exogenous context has occurred. As discussed above, in embodiments in which the triggering condition comprises detecting a change in exogenous context, the triggering condition is thus determined to be met, and the method may continue to operation 406 of FIG. 4, described below. In other embodiments, the triggering condition may comprise a change in exogenous context coupled with a decline in performance of the model. In these embodiments, if both the change in exogenous context and the decline in performance of the model are identified, the method may then continue to operation 406.

Returning to FIG. 4, as shown by operation 406, the apparatus 200 includes means, such as processor 202, memory 204, context analysis circuitry 210, and/or the like, for scheduling, based on the occurrence of the triggering condition, retraining of the model. In this regard, it is determined that model retraining is needed based on the occurrence of the triggering condition (e.g., a change in exogenous context and/or a decline in performance of the model).

As shown by operation 408, the apparatus 200 includes means, such as processor 202, memory 204, communications circuitry 206, input-output circuitry 208, data grafting circuitry 212 and/or the like, for generating, in response to scheduling the retraining of the model, a context-relevant training data set based on a target context vector. Upon the retraining of the model having been scheduled, the modeling system 102 may then begin analyzing the known training data index in order to identify context vectors having an exogenous context most relevant to the exogenous context a target context vector. These context vectors may then be grafted together to generate a context-relevant training data set, as further described below.

Figure 6:
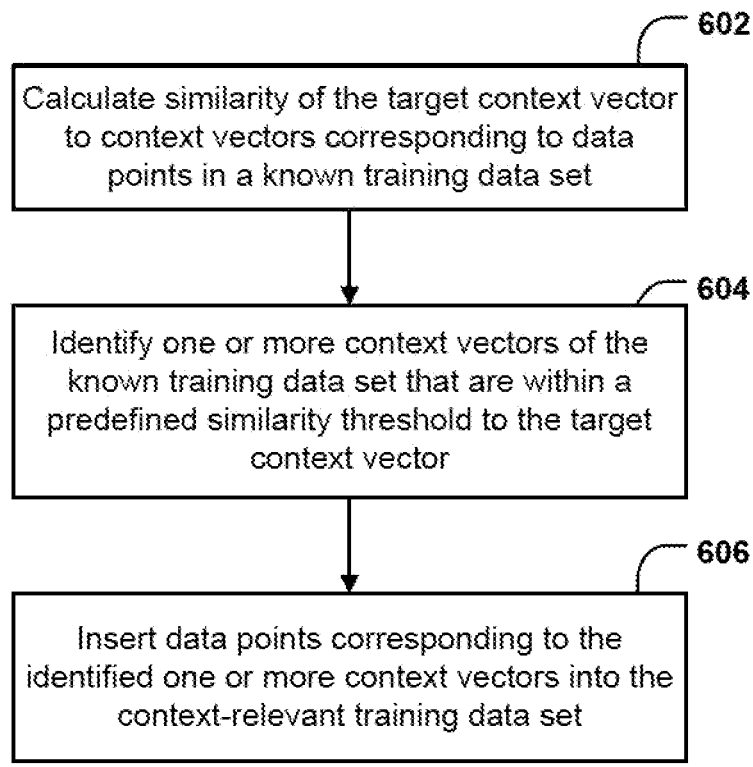
FIG. 6 illustrates another example flowchart for generating a context-relevant training data set, in accordance with some example embodiments described herein.

Turning briefly to FIG. 6, example operations are shown for generating a context-relevant training data set.

As shown by operation 602, the apparatus 200 includes means, such as processor 202, memory 204, context analysis circuitry 210, and/or the like, for calculating similarity of the target context vector to context vectors corresponding to data points in a known training data index. Each similarity calculation may occur in the manner described previously in connection with operation 502 of FIG. 5. For example, in some embodiments, the context vectors stored in the known training data index (e.g., as described above in connection with FIG. 3) may be analyzed to determine whether the exogenous context of a respective context vector is similar enough to the exogenous context of the target context vector such that a model of the modeling system could be retrained using the respective context vector to produce a more accurate output (e.g., prediction). In some embodiments, each context vector of the known training data index may be analyzed to determine its relevance to the target context vector.

In some embodiments, calculating the similarity of the target context vector to a respective context vector of the known training data index may comprise calculating a cosine similarity of the target context vector to the respective context vector. For example, in some embodiments, a cosine similarity of each variable value defining the exogenous context of the target context vector to a corresponding variable value defining the exogenous context of the respective context vector may be calculated and averaged together to determine a cosine similarity of the target context vector to the respective context vector.

As shown by operation 604, the apparatus 200 includes means, such as processor 202, memory 204, context analysis circuitry 210, and/or the like, for identifying one or more context vectors of the known training data index that are within a predefined similarity threshold to the target context vector. In this regard, if a respective context vector is within a predefined similarity threshold to the target context vector (e.g., based on their cosine similarity), the data point corresponding to that context vector may then be included as part of a context-relevant training data set.

As shown by operation 606, the apparatus 200 includes means, such as processor 202, memory 204, data grafting circuitry 212, and/or the like, for inserting the data points corresponding to the identified one or more context vectors into the context-relevant training data set. For the initial comparison between the target context vector and one of the context vectors in the known training data index, operation 606 may further include creating the context-relevant training data set, after which the various data points may be inserted.

Returning to FIG. 4, as shown by operation 410, the apparatus 200 includes means, such as processor 202, memory 204, model training circuitry 214, and/or the like, for retraining the model using the context-relevant training data set to mitigate deterioration of performance of the model. In this regard, the modeling system 102 efficiently harnesses a more precisely tailored set of training data for the model that is both relevant to the target context vector and lightweight (e.g., having a vector data structure) such that the context-relevant training data set may be generated in real-time or in near real-time upon the modeling system having scheduled retraining of the model. In some embodiments, once the model is retrained, the method may iteratively return to operation 402 in which performance of the model is again analyzed over time to identify another triggering condition that may occur in the future.

As described above, example embodiments provide methods and apparatuses that enable improved mitigation of model deterioration. Example embodiments thus provide tools that overcome problems faced by modeling systems in circumstances in which exogenous factors disrupt the ability of one or more models to produce accurate and reliable output. By both quickly recognizing triggering conditions which may lead to model performance deterioration and in response automatically generating context-relevant training data that can be used for retraining the model to avoid the deterioration, example embodiments thus save time and resources, while also enhancing model robustness against changes in exogenous context that are inevitable in any real-world implementation. The speed and consistency of the model performance mitigation exhibited by example embodiments unlocks many potential new functions that have historically not been available, such as the ability to retrain models in near-real-time using highly context-relevant training data. As these examples all illustrate, example embodiments contemplated herein provide technical solutions that solve real-world problems faced during active deployment of modeling systems used for predicting events, behaviors, or the like.

FIGS. 3-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for mitigating deterioration of model performance, the method comprising:
    detecting, by context analysis circuitry, occurrence of a triggering condition;
    scheduling, by the context analysis circuitry and based on the occurrence of the triggering condition, retraining of a model;
    in response to scheduling the retraining of the model, generating, by data grafting circuitry, a context-relevant training data set based on a target context vector, wherein the context-relevant training data set comprises a grafted set of historical data points corresponding to one or more context vectors determined to satisfy a predefined similarity threshold to the target context vector; and
    retraining, by model training circuitry, the model using the context-relevant training data set to mitigate deterioration of performance of the model.

2. The method of claim 1, wherein generating the context-relevant training data set comprises:
    calculating, by the context analysis circuitry, similarity of the target context vector to context vectors corresponding to data points in a known training data index;
    identifying, by the context analysis circuitry, one or more context vectors of the known training data index that are within a predefined similarity threshold to the target context vector; and
    inserting, by the data grafting circuitry and into the context-relevant training data set, data points in the known training data index corresponding to the identified one or more context vectors.

3. The method of claim 1, wherein the triggering condition comprises a decline in performance of the model meeting a predefined decline threshold, and wherein the context analysis circuitry detects occurrence of the triggering condition by (i) analyzing performance of the model over time and (ii) identifying the predefined decline threshold in performance of the model.

4. The method of claim 3, wherein the predefined decline threshold is met in an instance in which analyzing performance of the model over time indicates that the model produces more than a predefined percentage of inaccurate predictions over a predefined time period.

5. The method of claim 3, wherein the predefined decline threshold is met in an instance in which analyzing performance of the model over time indicates that a predefined number of predictions by the model are inaccurate by more than a predefined performance threshold.

6. The method of claim 3, wherein the triggering condition comprises the decline in performance of the model coupled with a change in exogenous context.

7. The method of claim 1, wherein the context analysis circuitry detects occurrence of the triggering condition by identifying a change in exogenous context.

8. The method of claim 7, wherein the context analysis circuitry identifies the change in exogenous context by:
    calculating a similarity of the target context vector to a previous context vector;
    determining whether the calculated similarity satisfies a predefined similarity threshold; and
    in response to determining that the calculated similarity satisfies the predefined similarity threshold, identifying that the change in exogenous context has occurred.

9. An apparatus for mitigating deterioration of model performance, the apparatus comprising:
    context analysis circuitry configured to:
        detect occurrence of a triggering condition, and
        schedule, based on the occurrence of the triggering condition, retraining of a model;
    data grafting circuitry configured to generate, in response to scheduling the retraining of the model, a context-relevant training data set based on a target context vector, wherein the context-relevant training data set comprises a grafted set of historical data points corresponding to one or more context vectors determined to satisfy a predefined similarity threshold to the target context vector; and
    model training circuitry configured to retrain the model using the context-relevant training data set to mitigate deterioration of performance of the model.

10. The apparatus of claim 9, wherein the context analysis circuitry is configured to generate the context-relevant training data set is generated by:
    calculating similarity of the target context vector to context vectors corresponding to data points in a known training data index; and
    identifying one or more context vectors of the known training data index that are within a predefined similarity threshold to the target context vector,
    wherein the data grafting circuitry is further configured to insert data points in the known training data index corresponding to the identified one or more context vectors into the context-relevant training data set.

11. The apparatus of claim 9, wherein the triggering condition comprises a decline in performance of the model meeting a predefined decline threshold, and wherein the context analysis circuitry is configured to detects occurrence of the triggering condition by (i) analyzing performance of the model over time and (ii) identifying the predefined decline threshold in performance of the model.

12. The apparatus of claim 11, wherein the context analysis circuitry is configured to identify the predefined decline threshold in an instance in which analyzing performance of the model over time indicates that the model produces more than a predefined percentage of inaccurate predictions over a predefined time period.

13. The apparatus of claim 11, wherein the context analysis circuitry is configured to identify the predefined decline threshold in in an instance in which analyzing performance of the model over time indicates that a predefined number of predictions by the model are inaccurate by more than a predefined performance threshold.

14. The apparatus of claim 11, wherein the triggering condition comprises the decline in performance of the model coupled with a change in exogenous context.

15. The apparatus of claim 9, wherein the context analysis circuitry is configured to detect occurrence of the triggering condition by identifying a change in exogenous context.

16. The apparatus of claim 15, wherein the context analysis circuitry is configured to identify the change in exogenous context by:
calculating a similarity of the target context vector to a previous context vector;
determining whether the calculated similarity satisfies a predefined similarity threshold; and
in response to determining that the calculated similarity satisfies the predefined similarity threshold, identifying that the change in exogenous context has occurred.

17. A computer program product for mitigating deterioration of model performance, the computer program product comprising at least one non-transitory computer-readable storage medium storing software instructions that, when executed, cause an apparatus to:
detect occurrence of a triggering condition;
schedule, based on the occurrence of the triggering condition, retraining of a model;
in response to scheduling the retraining of the model, generate a context-relevant training data set based on a target context vector, wherein the context-relevant training data set comprises a grafted set of historical data points corresponding to one or more context vectors determined to satisfy a predefined similarity threshold to the target context vector; and
retrain the model using the context-relevant training data set to mitigate deterioration of performance of the model.

18. The computer program product of claim 17, wherein the software instructions cause the apparatus to generate the context-relevant training data set by:
calculating similarity of the target context vector to context vectors corresponding to data points in a known training data index;
identifying one or more context vectors of the known training data index that are within a predefined similarity threshold to the target context vector; and
inserting data points in the known training data index corresponding to the identified one or more context vectors into the context-relevant training data set.

19. The computer program product of claim 17, wherein the triggering condition comprises a decline in performance of the model meeting a predefined decline threshold, and wherein the software instructions cause the apparatus to detect occurrence of the triggering condition by (i) analyzing performance of the model over time and (ii) identifying the predefined decline threshold in performance of the model.

20. The computer program product of claim 19, wherein the predefined decline threshold is met in an instance in which analyzing performance of the model over time indicates that the model produces more than a predefined percentage of inaccurate predictions over a predefined time period.

* * * * *